US009532032B2

(12) United States Patent
Tsukanov et al.

(10) Patent No.: US 9,532,032 B2
(45) Date of Patent: Dec. 27, 2016

(54) ASTIGMATIC DEPTH FROM DEFOCUS IMAGING USING INTERMEDIATE IMAGES AND A MERIT FUNCTION MAP

(71) Applicant: Ellis Amalgamated, LLC, Arlington, MA (US)

(72) Inventors: Vitaly G. Tsukanov, Lviv (UA); Yuriy V. Bashtyk, Sokal (UA); Gregg E. Favalora, Bedford, MA (US)

(73) Assignee: Ellis Amalgamated, LLC, Arlington, MA (US)

( * ) Notice: Subject to any disclaimer, the term of this patent is extended or adjusted under 35 U.S.C. 154(b) by 210 days.

(21) Appl. No.: 14/256,085

(22) Filed: Apr. 18, 2014

(65) Prior Publication Data

US 2015/0015676 A1    Jan. 15, 2015

Related U.S. Application Data

(60) Provisional application No. 61/854,149, filed on Apr. 18, 2013.

(51) Int. Cl.
*H04N 13/02* (2006.01)
*G06T 5/00* (2006.01)

(52) U.S. Cl.
CPC .......... *H04N 13/0271* (2013.01); *G06T 5/003* (2013.01); *H04N 13/0253* (2013.01); *G06T 2200/04* (2013.01); *G06T 2207/10028* (2013.01)

(58) Field of Classification Search
CPC ... H04N 13/0271; H04N 13/0253; G06T 5/03; G06T 2200/04; G06T 2207/10028; G06T 5/003
See application file for complete search history.

(56) References Cited

U.S. PATENT DOCUMENTS

| | | | | |
|---|---|---|---|---|
| 5,848,193 A * | 12/1998 | Garcia | ..................... | G06K 9/52 382/199 |
| 6,678,406 B1 * | 1/2004 | Mojsilovic | ............. | H04N 1/644 358/1.9 |
| 8,249,365 B1 * | 8/2012 | Winnemoeller | ...... | G06T 11/001 382/181 |
| 2002/0048395 A1 * | 4/2002 | Harman | ................ | G06T 7/0053 382/154 |
| 2002/0105514 A1 * | 8/2002 | Roche, Jr. | .......... | H04N 13/0025 345/419 |
| 2003/0020708 A1 * | 1/2003 | Redert | ............... | H04N 13/0011 345/418 |
| 2003/0030651 A1 * | 2/2003 | Gibbs | .................... | G09G 5/026 345/619 |
| 2003/0156187 A1 * | 8/2003 | Gluckman | ......... | H04N 13/0217 348/46 |
| 2004/0027585 A1 * | 2/2004 | Groot | ................. | G01B 11/0608 356/511 |

(Continued)

*Primary Examiner* — Jayanti K. Patel
*Assistant Examiner* — Joseph Suh
(74) *Attorney, Agent, or Firm* — Occhiuti & Rohlicek LLP

(57) ABSTRACT

A rangefinder has a depth camera and a computer. The depth camera is positioned to receive electromagnetic energy from a scene. Imaging optics and a sensor in the camera generate an input image based on electromagnetic energy. The computer receives the input image, calculates intermediate images by applying differentiation operators along different axes to the input image, creates a merit function map, and computes a depth map from the merit function map.

18 Claims, 18 Drawing Sheets

(56) References Cited

U.S. PATENT DOCUMENTS

| | | | |
|---|---|---|---|
| 2004/0037465 A1* | 2/2004 | Krause | G06K 9/0063 |
| | | | 382/199 |
| 2005/0232467 A1* | 10/2005 | Mohri | G06F 3/0304 |
| | | | 382/103 |
| 2010/0073364 A1* | 3/2010 | Jung | G06T 7/0063 |
| | | | 345/419 |
| 2010/0128841 A1* | 5/2010 | Imas | G06T 5/50 |
| | | | 378/16 |
| 2011/0025831 A1* | 2/2011 | Bewersdorf | G02B 21/16 |
| | | | 348/50 |
| 2011/0206282 A1* | 8/2011 | Aisaka | G06T 11/60 |
| | | | 382/195 |
| 2012/0069320 A1* | 3/2012 | Simonov | G01C 3/32 |
| | | | 356/4.04 |
| 2012/0203518 A1* | 8/2012 | Dogru | G01V 99/005 |
| | | | 703/2 |
| 2013/0033591 A1* | 2/2013 | Takahashi | G06K 9/50 |
| | | | 348/77 |
| 2014/0132791 A1* | 5/2014 | Tzur | H04N 5/23212 |
| | | | 348/222.1 |

* cited by examiner

S. K. Nayar, M. Watanabe, and M. Noguchi, "Real-time focus range sensor," *IEEE Trans. On Pattern Analysis and Machine Intelligence*, 18(12): 1186-1198 (1996).

Isotropic filter for preliminary filtering "bublik"

FIG. 12
Anisotropic filters for V(x,y) and H(x,y) extracting
gsf
$$fl(x,y) = k \cdot \exp\left[-\left[\left(\frac{x-\mu x}{\sigma x}\right)^2 + \left(\frac{y-\mu y}{\sigma y}\right)^2\right]\right]$$
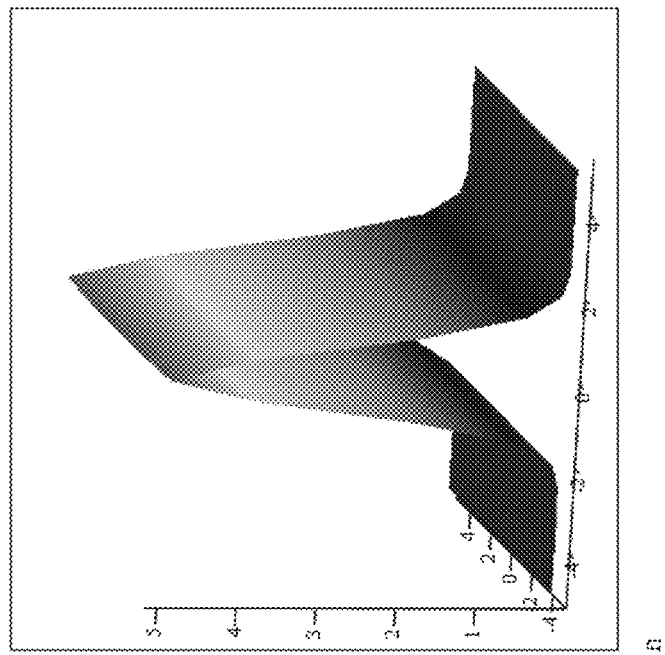
gtf
$$fl(x,y) = k \cdot \exp\left[-\left[\left(\frac{x-\mu x}{\sigma x}\right)^2 + \left(\frac{y-\mu y}{\sigma y}\right)^2\right]\right]$$
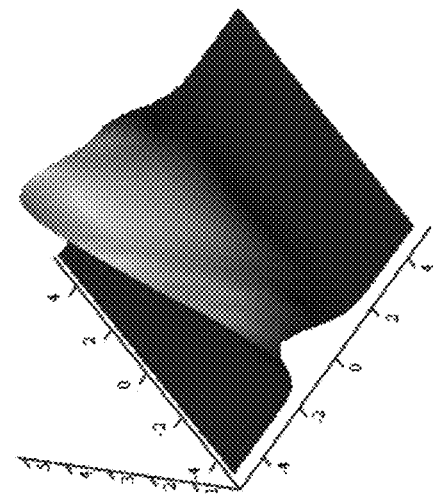

Combined filters

```
%===================Distance map algorithm Type A: Anisotropic filtration

%===STEP 1: load input image

[FileName,PathName,FilterIndex] = uigetfile('*.png;*.bmp;*.jpg;*.tif;*.jpeg');
I = imread([PathName FileName]);
I = rgb2gray(I);        % transform initial image into B&W veiw
h = size(I, 1);
w = size(I, 2);

%=== OPTIONAL STEP 2: Optional pre-processing: Isotropic filtration
=================================
I_s = fft(I);            %== OPTIONAL STEP 2A: input image fourier spectrum calculation
param = [30, 30];        %== OPTIONAL STEP 2B: filter parameter definition
filter = specFilter(w, h, 'bublik', param);    %==filter type definition
I_s = I_s .* filter;     %== OPTIONAL STEP 2C Applying of filter to input image spatial spectrum
I = abs(ifft(I_s));      %==re-construction of pre-processed input image figure;
imshow(I, [min(min(I)) max(max(I))]);          %==pre-processed image readout
%=== STEP 3: Extracting of intermediate pictures H(x,y) and V(x,y)
%===Type A:
[Ix, Iy] = gsf(I, 3);    %== applying of subroutine that:
                         %== STEP 3A(1) filters the image by means of Gaussian Stripe Filter
                (gsf),
                         %== namely, vertical and horizontal stripe having
                         %== Gaussian profile with parameter "sigma"
                         %== STEP 3A(2): restore the intermediate pictures
                         %== H(x,y) and V(x,y) by means of inverse FT.
                         %==(see code "gsf" below for details)
%=== STEP 4 MFM forming===
%=== STEP 4A(i) MFM method definition:
res = (Ix - Iy);
%=== OPTIONAL STEP 4B Blurring of MFM by means of median filter
res = medfilt2(res, [20 20]);
%=== OPTIONAL STEP 5: MFM readout
figure;
imshow(res, [min(min(res)) max(max(res))]);
colormap default;
colorbar();
```

FIG. 14A

%=== STEP 6: Compute the depth map: This step is omitted now.

================================================================================
==

%===Isotropic filter for optional pre-processing "bublik"
%
```
function filter = specFilter(width, height, filter_name, fparam)
if strcmp(filter_name, 'bublik');
   r0 = fparam(1);
   sigma = fparam(2);

points_w = linspace(-width/2, width/2, width);
   points_h = linspace(-height/2, height/2, height);
   [x, y] = meshgrid(points_w, points_h);
   f = exp( -( ( sqrt(x.^2 + y.^2) - r0).^2)/(2*sigma^2));
   filter = imcomplement(f);

else
   filter = ones(width, height);
end
end
```

================================================================================
====

%===Anisotropic filter for V(x,y) and H(x,y) Type 1

%Subroutine gsf (I,3)

%Gauss strip filter (gsf)
```
function [Ix, Iy] = gsf(I, sigma)

width = size(I, 2);
height = size(I, 1);
%sigma = 3;

%=== Generate horizontal filter ===================================
x = 1:1:width;
```

FIG. 14B

```
gausian = -exp(- (x - width / 2).^2 / sigma^2);

filter_x = zeros([height width]);

for i = 1:height
   filter_x(i,:) = gausian;
end

%=== Generate vertical filter =======================================
x = 1:1:height;

gausian = -exp(- (x - height / 2).^2 / sigma^2);

filter_y = zeros([height width]);

for i = 1:width
   filter_y(:,i) = gausian;
end
```

FIG. 14C

%=================Distance map algorithm Type B: X and Y differentiation

%===STEP 1: load input image
[FileName,PathName,FilterIndex] = uigetfile('*.png;*.bmp;*.jpg;*.tif;*.jpeg');
I = imread([PathName FileName]);
I = rgb2gray(I);
h = size(I, 1);
w = size(I, 2);

%=== OPTIONAL STEP 2: Optional pre-processing: Isotropic filtration =================
  %== OPTIONAL STEP 2A: input image fourier spectrum calculation
I_s = fft(I);

%== OPTIONAL STEP 2B: filter parameter definition and filter type definition
param = [30, 30];
filter = specFilter(w, h, 'bublik', param);

%== OPTIONAL STEP 2C Applying of filter to the input image spatial spectrum
I_s = I_s .* filter;

%=== STEP 3: Extracting of intermediate pictures H(x,y) and V(x,y)
%    Type B:

%===STEP 3B(1) ==re-construction of pre-processed input image and its readout
I = abs(ifft(I_s));
figure;
imshow(I, [min(min(I)) max(max(I))]);  %==pre-processed image readout %===STEP 3B(2) applying of standard MATLAB gradient operator to get
  %===the 2 pictures of horizontal and vertical spatial frequencies distributions.
[dIx, dIy] = gradient(double(I)); %==:
dIx = abs(dIx);
dIy = abs(dIy);

%===STEP 3B(3) Blur picturs with gaussian kernel
  ===============================
G = fspecial('gaussian',[30 30],15);
dIx = imfilter(dIx,G,'same');
dIy = imfilter(dIy,G,'same');

FIG. 14D

```
%=== STEP 4 MFM forming===
            %=== STEP 4A(i) MFM method definition:
res = (dlx - dly);
            %=== OPTIONAL STEP 4B Blurring of MFM by means of median filter
res = medfilt2(res, [20 20]);

%=== OPTIONAL STEP 5: MFM readout
figure;
imshow(res, [min(min(res)) max(max(res))]);
colormap default;
colorbar();

%=== STEP 6: Compute the depth map: This step is omitted now.

========================================================================

%===Isotropic filter for optional pre-processing "bublik"
%
function filter = specFilter(width, height, filter_name, fparam)
if strcmp(filter_name, 'bublik');
   r0 = fparam(1);
   sigma = fparam(2);

points_w = linspace(-width/2, width/2, width);
   points_h = linspace(-height/2, height/2, height);
   [x, y] = meshgrid(points_w, points_h);
   f = exp( -(( sqrt(x.^2 + y.^2) - r0).^2)/(2*sigma^2));
   filter = imcomplement(f);

else
   filter = ones(width, height);
end
end
```

FIG. 14E

ASTIGMATIC DEPTH FROM DEFOCUS IMAGING USING INTERMEDIATE IMAGES AND A MERIT FUNCTION MAP

CROSS-REFERENCE TO RELATED APPLICATIONS

This application claims the benefit of the Apr. 18, 2013 priority date of U.S. Provisional Application 61/854,149, the contents of which are herein incorporated by reference.

FIELD OF INVENTION

The present invention relates to three-dimensional imaging systems, and particularly to depth-from-defocus optical apparatus.

BACKGROUND OF THE INVENTION

Various optical systems have been developed for estimating the distance to and shape of objects. These are sometimes referred to as rangefinders, range sensors, and depth map cameras. Here, they will be referred to as "rangefinders." A rangefinder estimates distances to one or more regions within a scene. The scene can contain one or more objects.

Some rangefinders estimate depth by analyzing the blur that is present in at least one image of the scene. Examples of such rangefinders are described in S. K. Nayar, M. Watanabe, and M. Noguchi, "Real-Time Focus Range Sensor," IEEE Transactions on Pattern Analysis and Machine Intelligence, vol. 18, no. 12, 1186-1198 (December 1996), S. Bae and F. Durand, "Defocus Magnification," Computer Graphics Forum, 26, 571-579 (2007), G. C. Birch, J. S. Tyo, and J. Schwiegerling, "3D Astigmatic Depth Sensing Camera," Proc. SPIE 8129, Novel Optical Systems Design and Optimization XIV, 812903 (Sep. 9, 2011), and in J. H. Elder and S. W. Zucker, "Local Scale Control for Edge Detection and Blur Estimation," IEEE Transactions on Pattern Analysis and Machine Intelligence, vol. 20, no. 7, 699-716 (July 1998)

Existing rangefinders have various disadvantages. For example, time-of-flight, structured illumination, or existing depth-from-defocus devices, are typically undesirably sensitive to ambient light and object color or reflectivity, provide infrequent depth data, are too expensive for certain applications, or have insufficient depth accuracy.

Thus, to obtain range information of the scene in a manner that cures at least some of these disadvantages, another approach to obtaining depth information must be used.

SUMMARY

The invention is based on the recognition that astigmatic optical imaging and certain software algorithms are adaptable to measurement of distances to regions within a scene.

In one aspect, the invention features an apparatus comprising a rangefinder. The rangefinder has a depth camera and a computer. The depth camera is positioned to receive electromagnetic energy from a scene. The depth camera comprises imaging optics and a sensor configured to generate an input image based on the electromagnetic energy. The computer is computer programmed to receive the input image, to calculate intermediate images $H(x,y)$ and $V(x,y)$ by applying the partial differentiation operators along 2 orthogonal directions (for example, X direction and Y direction) x- and y-differentiation operators to the input image, to create a merit function map; and to compute a depth map from the merit function map.

In some embodiments, the imaging optics are astigmatic.

In another aspect, the apparatus features a rangefinder and a computer. The rangefinder has a depth camera that is positioned to receive electromagnetic energy from a scene. The depth camera includes imaging optics and a sensor configured to generate an input image based on the electromagnetic energy. The computer is programmed to receive the input image, to calculate first and second intermediate images along corresponding first and second orthogonal axes that differ, to create a merit function map based on the intermediate images, and to compute a depth map from the merit function map.

In some embodiments, the first and second axes may be orthogonal. Among these are embodiments in which the first and second axes are horizontal and vertical axes.

In some embodiments, the imaging optics are astigmatic. In others, the imaging optics are stigmatic.

Among the embodiments are those in which the computer is programmed to calculate the intermediate images by applying, to the input image, corresponding differentiation operators along the first and second axes that differ, and those in which the computer is programmed to calculate the intermediate images by anisotropic filtering of the input image in the frequency domain.

In some embodiments, the computer is programmed to create the merit function map in a way that includes blurring the intermediate images.

In other embodiments, the computer is programmed to create the merit function in a way that includes evaluation of a function of the intermediate images on a pixel-by-pixel basis.

Embodiments also include those in which the computer is programmed to select the first and second axes to be horizontal and vertical axes, those in which the computer is programmed to select the first and second axes to be orthogonal axes, and those in which the computer is programmed to select the first and second axes to be non-orthogonal, but nevertheless different, axes.

In another aspect, the invention features an apparatus having a computer and means for relaying information indicative of a scene to the computer. The computer is programmed to receive an input image from the means for relaying information, to calculate, from the input image, first and second intermediate images along first and second axes that differ from each other, to create a merit function map based on the images, and to compute a depth map from the merit function map.

In yet another aspect, the invention features a method of generating a depth map. Such a method includes receiving an input image indicative of a scene, calculating a first intermediate image from the input image, calculating a second intermediate image from the input image, creating a merit function map based on the intermediate horizontal and vertical images, and computing the depth map from the merit function map. In this embodiment, the first and second intermediate images are along first and second axes that differ from each other.

In some practices, receiving the image comprises receiving an astigmatic image. In others, it includes receiving a stigmatic image.

Among the practices of the invention are those in which calculating an intermediate horizontal image from the input image comprises applying a horizontal differentiation operator to the input image, and calculating an intermediate vertical image from the input image comprises applying a vertical differentiation operator to the input image.

In other practices, calculating first and second intermediate images from the input image includes single-coordinate differentiation of the input image in the spatial domain.

In some practices, calculating a first intermediate image from the input image comprises anisotropic filtering of the input image in the frequency domain, and calculating a second intermediate image from the input image comprises anisotropic filtering in the frequency domain Among the practices of the invention are those that also include creating the merit function map comprises blurring the intermediate images.

In yet other practices of the invention, creating the merit function comprises evaluating a function of the intermediate images on a pixel-by-pixel basis.

Also among the practices of the invention are those that include selected the first and second axes to be horizontal and vertical axes, selecting them to be orthogonal axes, and selecting them to be non-orthogonal axes.

These and other features of the invention will be apparent from the following detailed description and the accompanying drawings, in which:

BRIEF DESCRIPTION OF THE DRAWINGS

FIG. 12 shows the isotropic filters "gsf" and "gtf";
FIGS. 14A-E show MATLAB code for implementing the method described herein.

DETAILED DESCRIPTION

Figure 1:
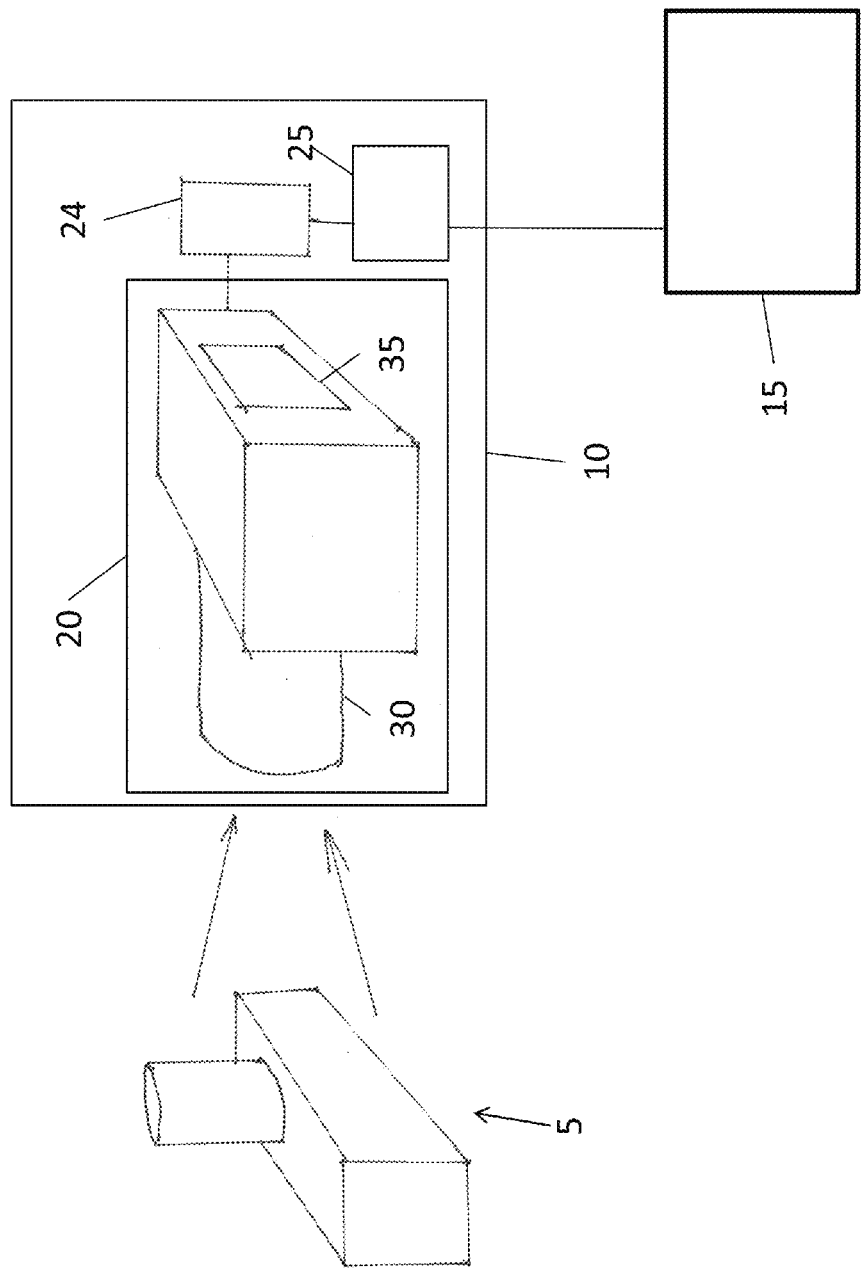
FIG. 1 shows a typical embodiment of an astigmatic rangefinder.

Referring to FIG. 1, in a typical embodiment of the astigmatic rangefinder, a rangefinder 10 images a scene 5 to produce at least one depth map 15. The rangefinder 10 has a depth camera 20 and a processing system 25. The depth camera 20 has imaging optics 30 and a sensor 35.

The depth camera 20 produces image data 24 (alternatively, an "input image") that is made available to the processing system 25.

Figure 2:
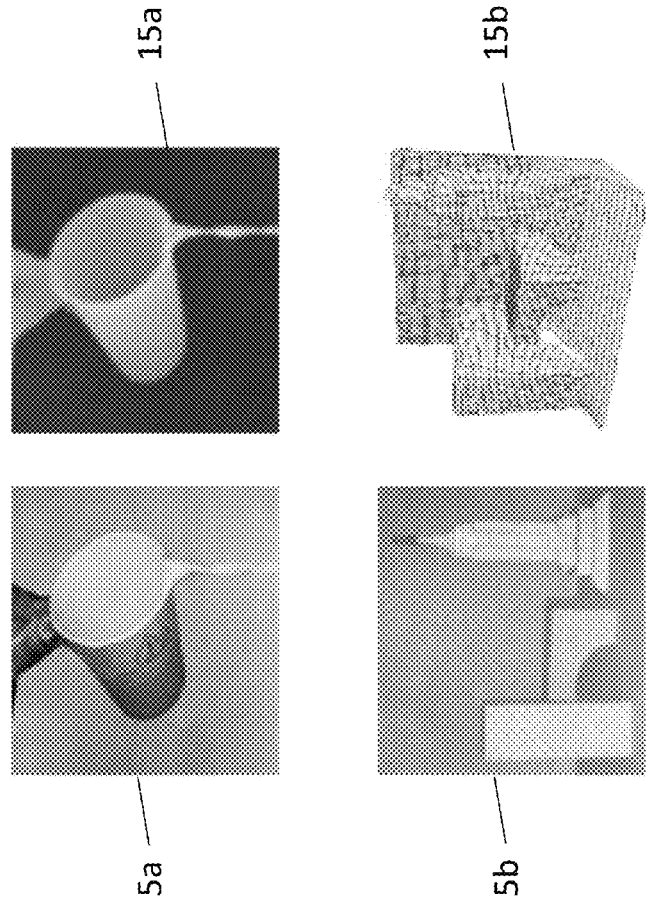
FIG. 2 shows scenes and depth maps.

FIG. 2 illustrates scenes and depth maps as generated by an existing rangefinder. The top row shows an example of a scene 5a of liquid being poured out of a container and the corresponding depth map 15a. Usually, a depth maps is a two-dimensional scalar array in which each scalar corresponds to a distance. For example, a value near 0 indicates "near" and a value near 255 indicates "far." It is convenient to depict depth maps graphically, as shown by the exemplary depth map 15a. In this case, "near" is rendered in white, intermediate distances are rendered in gray, and "far" is rendered in black.

An alternative representation of a depth map 15 is illustrated in the bottom row of FIG. 2. In this representation, a depth map 15b is rendered as a three-dimensional surface plot that can be computationally rotated to inspect the estimated depths of a corresponding scene 5b.

There are many ways to decouple the time and space aspects of depth map estimation. FIG. 2 shows two-dimensional depth maps in which the input "snapshot" was taken approximately instantaneously. Other types of rangefinders create a one-dimensional estimate of distances, or assemble a two-dimensional depth map from a series of one-dimensional range estimates that are scanned in time and space. Alternatively, a point-scanning rangefinder estimates depth measurements along a vector directed at a single point, which amounts to a zero-dimensional measurement.

Figure 3:
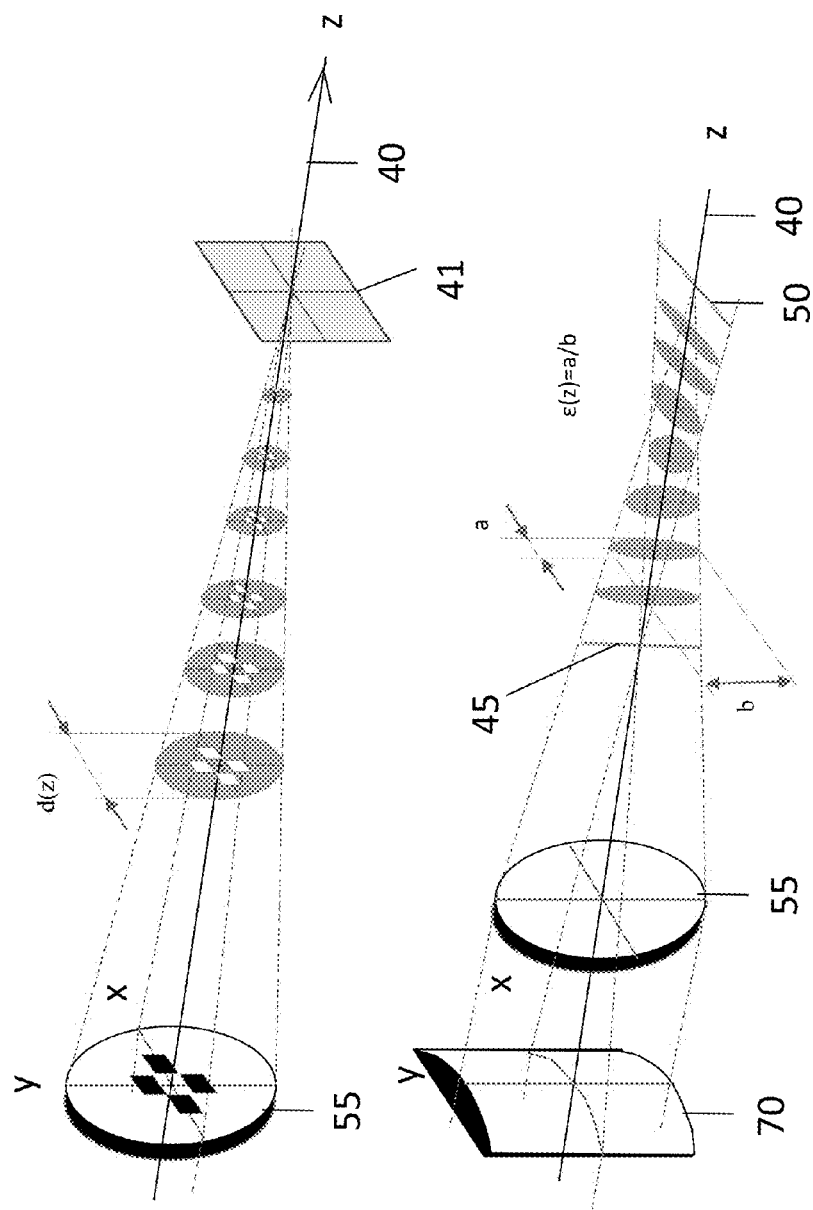
FIG. 3 shows imaging systems with stigmatic and astigmatic focus.

Imaging systems with stigmatic and astigmatic focusing are illustrated in FIG. 3, with the optical axis of the system being the z-axis 40 and with an x-axis and a y-axis orthogonal to this optical axis.

A typical imaging system, for example a camera, is designed to be as stigmatic as practical. In such a camera, there is ideally one location or surface of best focus 41. In such a case, the image of a single point is approximately a disc. The point-spread function (PSF) of such a single-focus imaging system has an aspect ratio of 1. For completeness, it is noted that the radius of the PSF in such a well-corrected system is primarily a function of the distance from the system to the object point, and to a first approximation the x, y, and z coordinates of the point do not result in a significant deviation from a 1:1 aspect ratio of the object point's PSF. To more complete approximations, the PSF is indeed a function of these variables, but the functional dependence is difficult to discern.

An important aspect of this invention is that the depth camera 20 is astigmatic, and therefore has multiple foci.

Referring now to the bottom of FIG. 3, the rangefinder 10 has a horizontal focus (or so-called XZ focus) at a first location 45 and a vertical (YZ) focus at a second location 50. Another way to say this is that the depth camera produces imagery with an elliptical point spread function (PSF) whose eccentricity $\epsilon(z)=a(z)/b(z)$ varies with distance to the point being imaged. A point situated on a surface with a particular distance from the system will thus produce an image with an eccentricity that is different from that of the image formed of a point situated on a surface that is at a different distance from the system. In addition, as is the case in in the stigmatic system, the scale of those images will vary with the point's distance from the system.

In an astigmatic system, information about the distance to the object is contained in the eccentricity of the PSF rather than primarily from its size, as is the case in a stigmatic system. This property of an astigmatic system provides improved robustness in situations relating to object brightness, illuminance, color, and texture.

In other versions of the system, the foci can have orientations other than horizontal and vertical. It is also possible to use optical components that employ nonstandard manipulations of the light to achieve any of a wide range of phase modulations, e.g. vortices, non-perpendicular orientations, etc.

Figure 4:
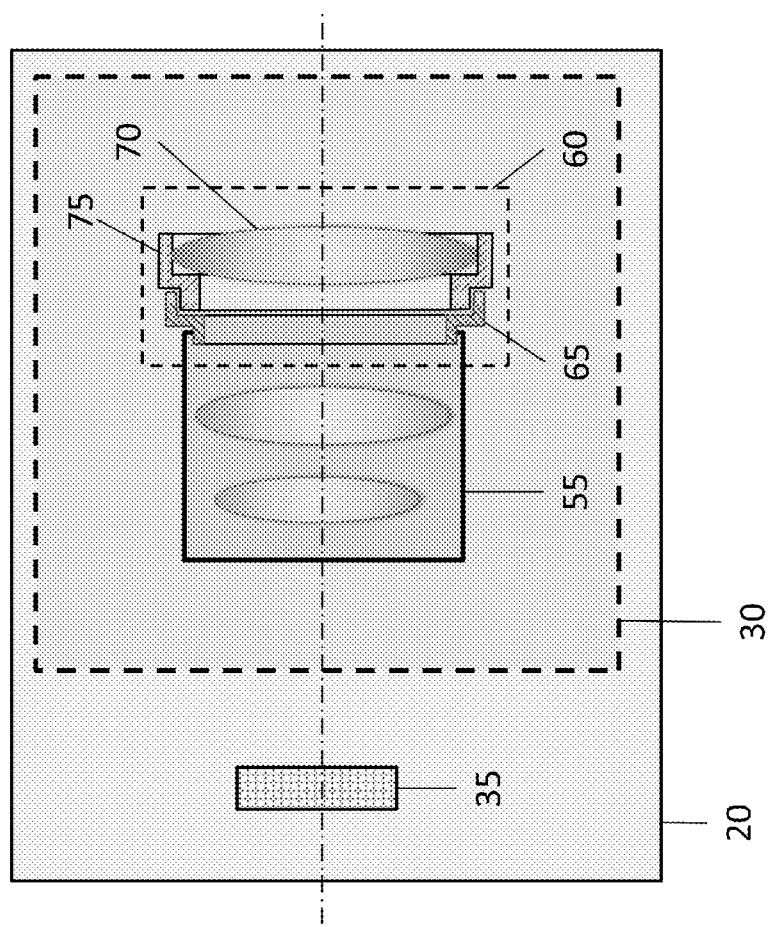
FIG. 4 shows the imaging optics.

FIG. 4 illustrates the imaging optics 30. The sensor 35, imaging optics 30, and other elements are selected using well-known optical systems engineering methods.

In a particular embodiment, the depth camera 20 is based on a Sony DSLR-A580. The depth camera 20 has imaging optics 30 that include a combination of an objective 55 (Sony SAL 50M28: macro objective, F=50 mm, f/#=2.8) and an astigmatic attachment 60. The astigmatic attachment 60 includes a step-up ring 65 (Marumi Stepping ring, 55 mm-72 mm), an opto-mechanical mount 75, and a cylindrical lens 70 (KangMing eyeglass lens, +0.00 S, +4.00 C, diameter 65 mm). The variable S is the spherical optical power of the cylindrical lens 70 in diopters, and C is the cylindrical optical power of the cylindrical lens 70 in diopters. Therefore the cylindrical lens 70 used in this embodiment is a purely cylindrical lens with a focal distance of 250 mm.

The optical components are held in position using standard techniques. In this case, the objective 55 is mounted to the step-up ring 65, which is in turn attached to the cylindrical lens 70 with the opto-mechanical mount 75. In the experimental system, the distance between the face of the objective 55 and the cylindrical lens 70 is approximately 10 mm and may be adjusted ±1.5 mm. The particular choice of these distances and tolerances is not limiting. The values are provided for reference.

The depth camera 20 begins generating the estimated depth map 15 by acquiring an input image 80 of the scene 5. This input image is denoted Io(x,y) and has horizontal and vertical dimensions of M by N pixels. Typically M=640 and N=480. In a more spatially-detailed analysis, (M, N)=(1200, 960). Other values of M and N can be used depending on the application.

After acquiring the input image 80, there is an optional step of pre-processing the image. This is carried out by computing a two-dimensional Fourier transfer of the image, Io(x,y). The result of this is a Fourier spectrum of the input image, $S_{Io}(\xi, \eta)$.

This is followed by an optional step of choosing an isotropic filter for removing low-frequency components, with a cut-off frequency near zero, and high frequency components, which are caused by picture noise. A suitable isotropic filter, "bublik," is described in more detail below. One purpose of the filter is to remove background illumination variations. Typically, the filter is cylindrically symmetric in a two-dimensional frequency domain, as depicted. Referring to FIG. 12, the low and high cut-off frequencies of the filter are tuned by varying filter constants After having chosen the filter, there is the optional step of generating a filtered two-dimensional image spatial Fourier spectrum $S_{Ip}(\xi, \eta)$. This can be carried out by applying "bublik" to the unfiltered spectrum $S_{Io}(\xi, \eta)$ by writing "bublik" and $S_{Io}(\xi, \eta)$ as M×N conformal matrices of scalar values and carrying out an element-by-element multiplication of these two matrices. Applying the filter "bublik" to $S_{Io}(\xi, \eta)$ thus amounts to the multiplication of each matrix element of the picture matrix at the corresponding matrix element of the filter.

The next step is to extract separate images with vertical and horizontal spatial frequencies, V(x, y) and H(x, y) respectively. There are two ways to do this. One is by anisotropic filtering in the frequency domain. The other, which is preferred, is by single-coordinate differentiation in the spatial domain.

Anisotropic filtering in the frequency domain is carried out by first filtering $S_{Ip}(\xi, \eta)$ in the frequency domain, generate intermediate images H(x,y) and V(x,y), and proceeding to distance map forming step described in more detail below.

To filter $S_{Ip}(\xi, \eta)$ in the frequency domain, one begins by choosing the horizontal and proper vertical anisotropic filter. A suitable filter looks like a vertical or horizontal stripe, such as a Gauss Stripe Filter ("GSF") or oblong ellipse, such as a Gauss Tenon Filter ("GTE"). Examples are shown in FIG. 12.

Applying the filter to $S_{Ip}(\xi, \eta)$ results in two filtered two-dimensional spatial spectra: a horizontal spectrum $S_H(\xi, \eta)$ and a vertical spectrum $S_V(v, \eta)$. The horizontal spectrum, $S_H(\xi, \eta)$, contains mostly horizontal spatial frequencies. The vertical spectrum, $S_V(\xi, \eta)$, contains mostly vertical frequencies. The inverse Fourier transforms of the horizontal and vertical spectra yield horizontal and vertical intermediate pictures H(x,y) and V(x,y) respectively.

Once the intermediate pictures are available, it is possible to proceed to the distance map forming step.

The alternative method for arriving at the distance map forming step is to carry out single-coordinate differentiation in the spatial domain.

This procedure begins by applying a two-dimensional inverse Fourier transform to the pre-filtered spectrum, $S_{Ip}(\xi, \eta)$. This results in a pre-filtered image Ip(x,y).

Next, a one-dimensional X differentiation operator is applied to the pre-filtered image Ip(x,y) or directly to the input image Io(x,y), if no image pre-processing was carried out. The X differentiation operator is the pixel-by-pixel difference of 2 adjacent columns. The result is H(x,y), the horizontal intermediate picture.

An analogous procedure is carried out to obtain the vertical intermediate picture V(x, y). A one-dimensional Y differentiation operator is applied to the pre-filtered image Ip(x,y). The Y differentiation operator is the pixel-by-pixel difference of 2 adjacent rows. The result is the vertical intermediate picture V(x,y).

Once the intermediate pictures are available, it is possible to proceed to the distance map forming step.

Figure 13:
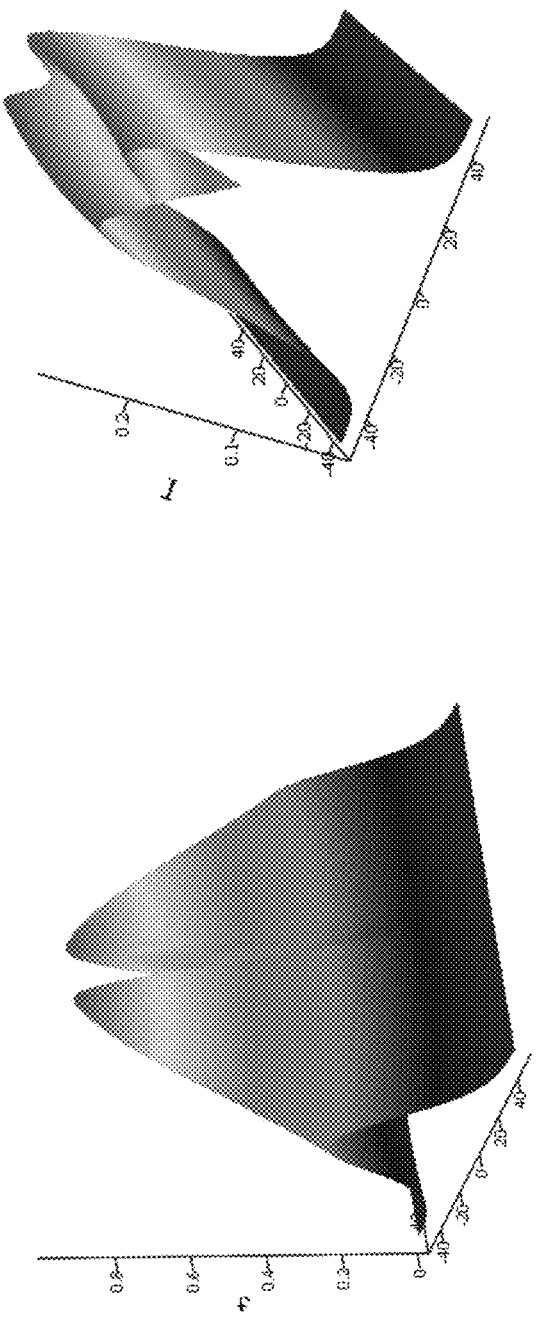
FIG. 13 shows combined filters.

Combined filters that overlap the isotropic pre-filtering and the extracting of intermediate pictures H(x,y) and V(x,y) may be used. One of the possible combined filters is presented in the FIG. 13.

The next step in either case is to create a merit function map. This includes the optional step of blurring the horizontal and vertical intermediate images H(x,y) and V(x,y) to obtain blurred horizontal and vertical intermediate images $H_B(x,y)$ and $V_B(x,y)$. Image blurring is carried out by convolving the relevant function with a Gaussian or cylindrical kernel.

A merit-function-forming algorithm is then selected to create the merit function map on a pixel-by-pixel basis. Examples include a differencing algorithm that evaluates a difference between the first and second intermediate images, a normalized difference algorithm in which the difference between the first and second intermediate images is normalized by their sum, a ratio algorithm in which the ratio of the norms of the first and second intermediate images is evaluated, a logarithmic ratio algorithm in which the logarithm of the ratio of the norms of the first and second intermediate images is evaluated, and a vector sum algorithm, which is analogous to a distance formula, which involves evaluating a square root of the sum of squares of the norms of the ratio of the norms of the first and second intermediate images. Other examples include a complex-valued merit function in which the first and second intermediate images are real and imaginary parts of a complex number, and a combined merit function created by a weighted ratio of first and second images. These exemplary merit function forming algorithms are summarized below, where "MFM" stands for "merit function map":

Difference: MFM=$H_B(x,y)-V_B(x,y)$

Normalized difference: MFM=$(H_B(x,y)-V_B(x,y))/(H_B(x,y)+V_B(x,y))$

Ratio: MFM=$|H_B(x,y)|/|V_B(x,y)|$

Logarithmic ratio: MFM=$\log_n[|H_B(x,y)|/|V_B(x,y)|]$

Vector sum: MFM=$[|H_B(x,y)|^2+|V_B(x,y)^2|]^{0.5}$

Combined: MFM=$[xV_B(x,y)/yH_B(x,y)]^{0.5}$

Complex: MFM=$H_B(x,y)+iV_B(x,y)$, where $i=(-1)^{0.5}$

Once the merit function map is evaluated, it is useful to inspect it. This can be carried out by transforming the merit function map into a two-dimensional image using well-known gray scale or pseudo-color visualization methods.

The final step is computation of the depth map 15. This is carried out by converting the relative distance estimates of the preceding step into calibrated, absolute estimates, which can the be portrayed in the depth map 15. Using well-known methods of calibration and for example look-up tables, the depth map 15 is based on the known dependence of merit function map values and distance values on the depth-map versus merit function map calibration table.

FIG. 14A-E shows these steps represented in the programming language MATLAB.

Figure 5:
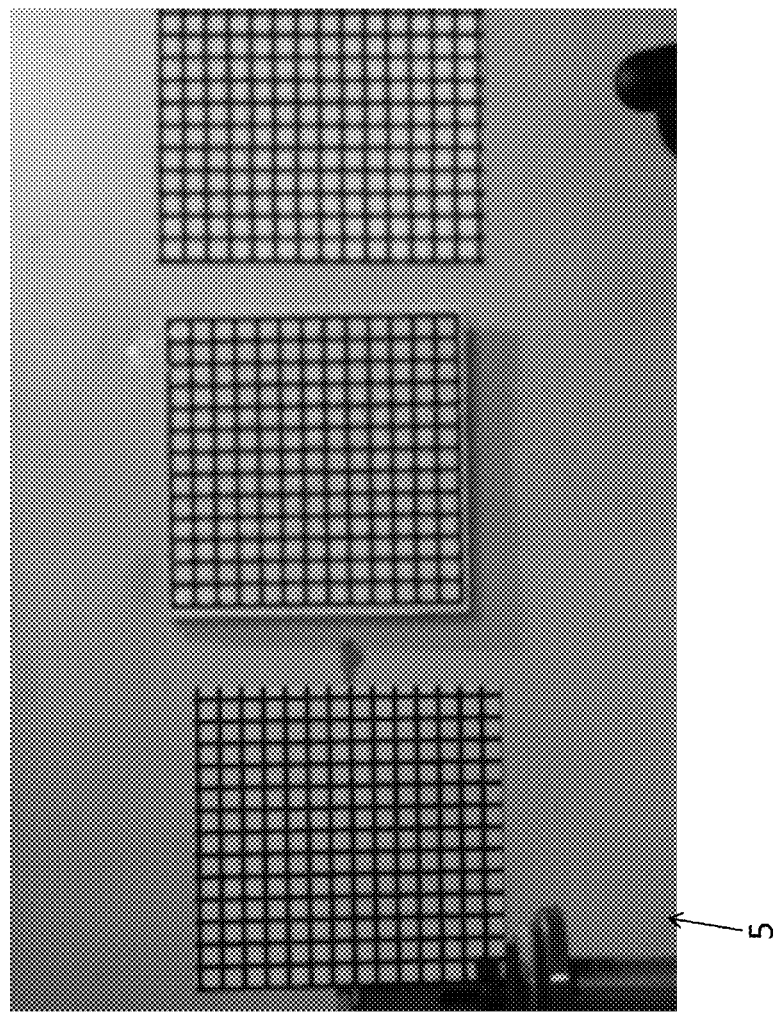
FIG. 5 shows a first example scene.
Figure 6:
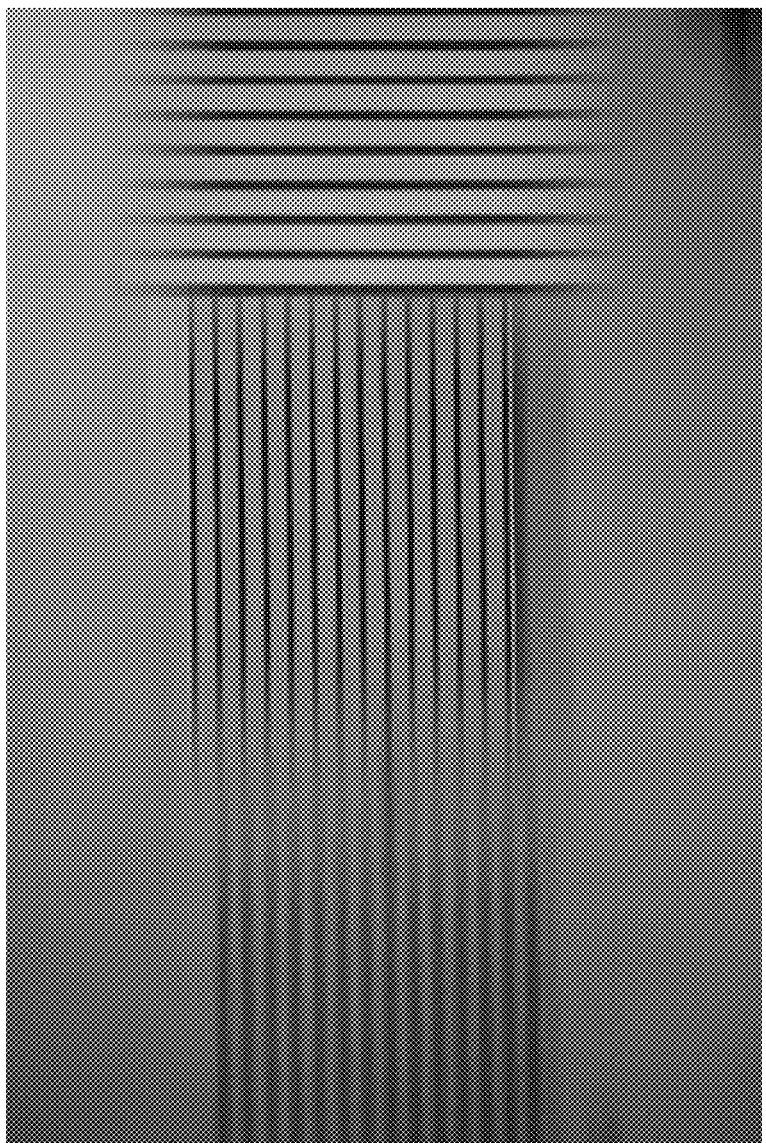
FIG. 6 shows the scene as imaged by an astigmatic depth camera.
Figure 7:
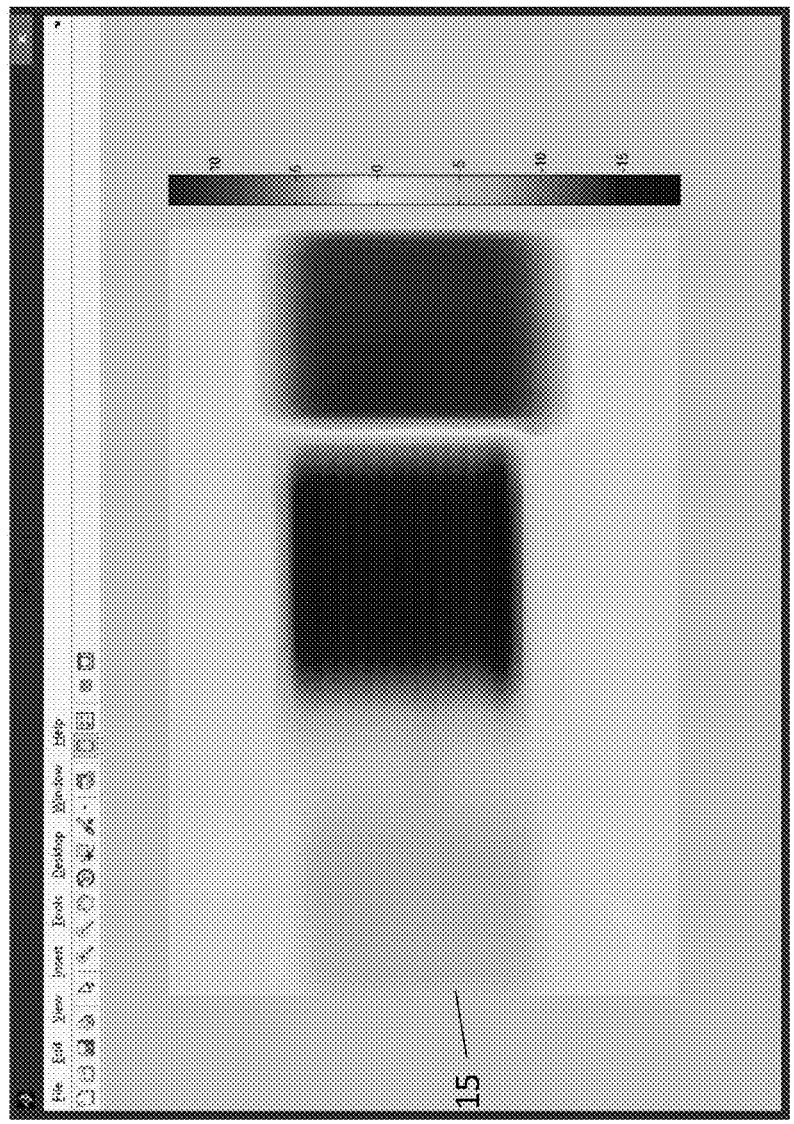
FIG. 7 shows the first example depth map.

A first example scene 5, illustrated in FIG. 5, shows a group of test targets at various depths. The scene 5, as imaged by the depth camera 20, is an input image 24 illustrated in FIG. 6. The impact of the astigmatic optics is noticeable as pronounced horizontal or vertical image features depending on the target depth. The first example depth map 15 is shown in FIG. 7, in which the distance values correspond to different numbers, and plotted as an image with pseudocolor.

Figure 8:
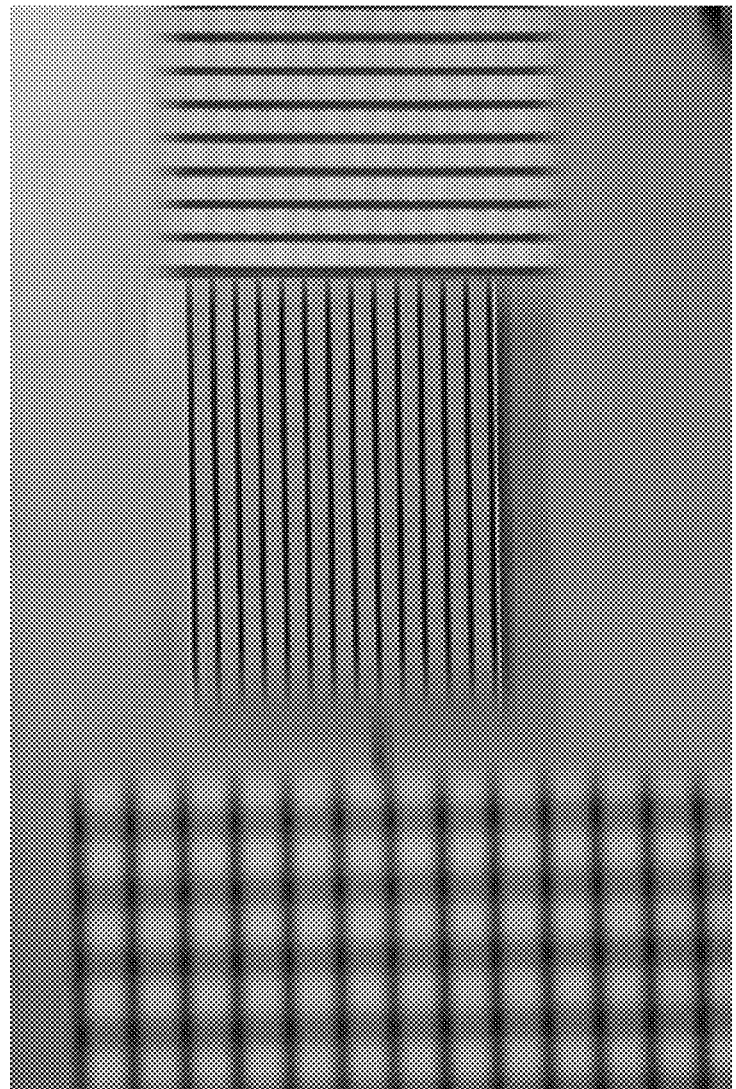
FIG. 8 shows a second example scene as imaged by the astigmatic depth camera.
Figure 9:
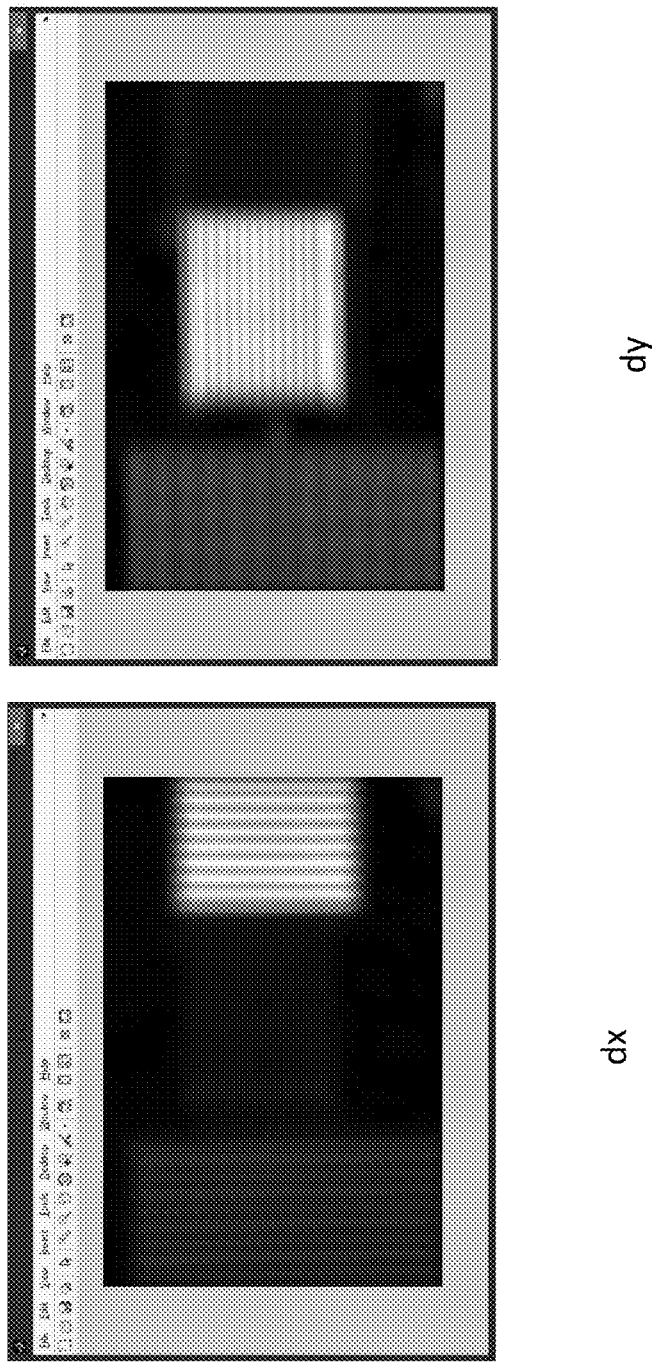
FIG. 9 shows accentuated vertical and horizontal image components.
Figure 10:
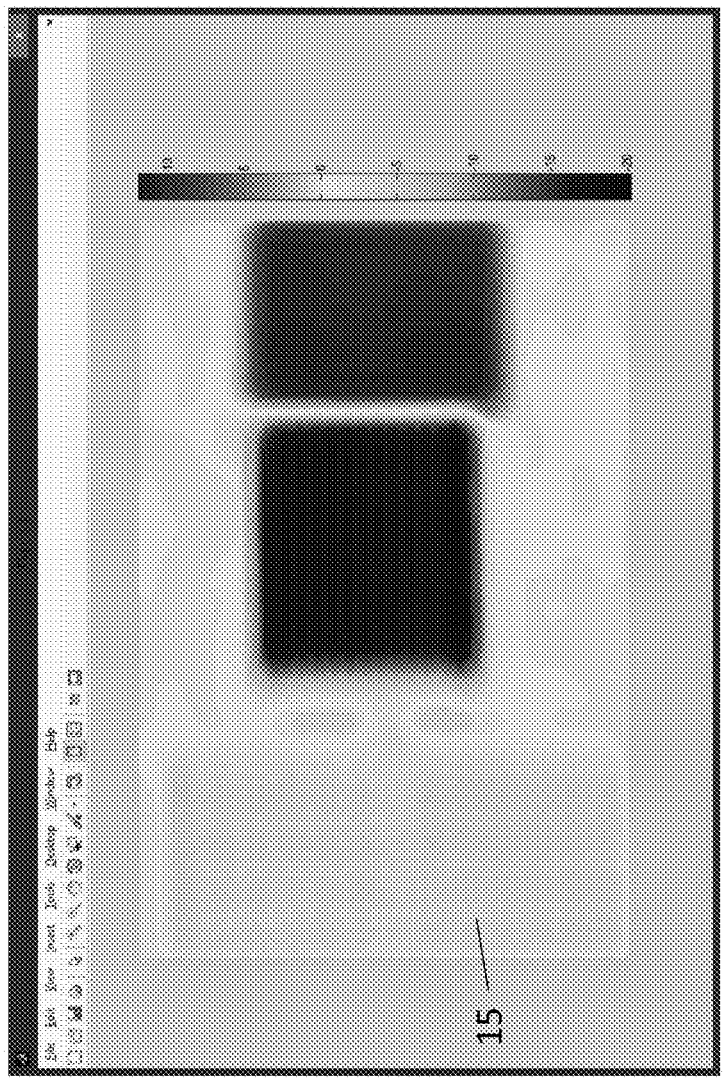
FIG. 10 shows the second example depth map.
Figure 11:
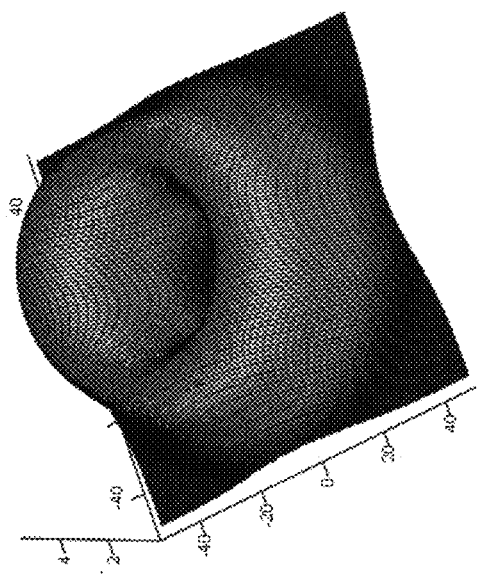
FIG. 11 shows "bublik," an isotropic pre-filtering kernel.

A second example scene 5 is imaged by the depth camera 20 as a second input image 24 as depicted in FIG. 8. The intermediate VB(x,y) and HB(x,y) arrays are obtained by single-coordinate differentiation in spatial domain (Type B) and depicted in FIG. 9. The resulting estimated depth map 15 is illustrated in FIG. 10, using the merit function maps forming algorithm following Step 4B(i) and pseudo-color visualization.

The scene 5 has three grids: (left) 137 cm, (center) 237 cm, (right) 37 cm.

The software can use calibration data in order to better associate depth estimates with true distances. For example, a lookup table can map estimated distance values to actual distance values.

The imaging optics 30 can be altered in various ways to change the characteristics of the input image 24 or to change the cost of the system.

For example, a fixed or adjustable iris can be added to modify the brightness and blur characteristics, a lens array or phase and/or amplitude-modulating optic (such as a transparency, spatial light modulator, or other well-known component) can be added to provide further depth-coding characteristics, or the relative angles and/or focusing power(s) of the imaging optics 30 can be adjusted to provide further depth-coding characteristics.

An active or passive illumination system can be added to the system, such as a point-cloud projector, a time-varying line projector, or other structured light device. The wavelength of the illumination can be visible, infrared, or other wavelength. The projected light would provide additional analysis points that can be inspected by the algorithm to produce a better depth estimate.

The merit function maps can be modified by various coefficients, such as a constant of proportionality, various mathematical functions, or other parameters well-known to those working in the field of machine vision.

A calibration step then lets the software output absolute (rather than relative) distance estimates in the depth map.

In the example described in detail above, the first and second intermediate images are in the horizontal and vertical directions. More generally, the intermediate images can be along any two different axes, whether orthogonal or otherwise.

Having described the invention, and a preferred embodiment thereof, what we claim as new, and secured by Letters Patent is:

1. An apparatus comprising a rangefinder, said rangefinder comprising a depth camera and a computer, wherein said depth camera is positioned to receive electromagnetic energy from a scene, wherein said depth camera comprises imaging optics and a sensor configured to generate an input image based on said electromagnetic energy, and wherein said computer is programmed to receive said input image, to calculate a first intermediate image from said input image, to calculate a second intermediate image from said input image, to create a merit function map based on said first and second intermediate images, and to compute a depth map from the merit function map, wherein said computer is further programmed to create said merit function map based on said first and second intermediate images by carrying out pixel-by-pixel calculations to create said merit function map using the formula $$m(x,y)=((X \cdot IPy(x,y)/(y \cdot IPx(x,y)))^{1/2}$$

wherein x and y are coordinates along first and second directions of differentiation, wherein IPy(x,y) is a first intermediate picture obtained by applying a partial differentiation operator to said input image along said first direction, and wherein IPx(x,y) is a second intermediate picture obtained by applying a partial differentiation operator to said input image along said first direction.

2. The apparatus of claim 1, wherein said imaging optics are astigmatic.

3. The apparatus of claim 1, wherein said computer is programmed to calculate said first intermediate image by applying a first differentiation operator to said input image, and wherein said computer is programmed to calculate said second intermediate image by applying a second differentiation operator to said input image, wherein said first and second differentiation operators are along different axes.

4. The apparatus of claim 1, wherein said computer is programmed to calculate said first intermediate image and said second intermediate image by single-coordinate differentiation of said input image in the spatial domain.

5. The apparatus of claim 1, wherein said computer is programmed to calculate said first intermediate image and said second intermediate image by anisotropic filtering of said input image in the frequency domain.

6. The apparatus of claim 1, wherein said computer is programmed to create said merit function map in a way that includes blurring said intermediate images.

7. The apparatus of claim 1, wherein said computer is programmed to create said merit function in a way that includes evaluation of a function of said intermediate images on a pixel-by-pixel basis.

8. The apparatus of claim 1, wherein said computer is programmed to select said first and second axes to be horizontal and vertical axes.

9. The apparatus of claim 1, wherein said computer is programmed to select said first and second axes to be orthogonal axes.

10. A method for operating a rangefinder, said method comprising generating a depth map, wherein generating said depth map comprises receiving an input image indicative of a scene, calculating a first intermediate image along a first axis from said input image, calculating a second intermediate image along a second axis from said input image, said second axis differing from said first axis, creating a merit function map based on said first and second intermediate images, and computing said depth map from said merit function map, wherein creating a merit function map based on said first and second intermediate images comprises creating said merit function map by pixel-by-pixel calculation using the formula $m(x,y)=((X \cdot IPy(x,y)/(y \cdot IPx(x,y)))^{1/2}$, wherein x and y are coordinates along first and second directions of differentiation, wherein IPy(x,y) is a first intermediate picture obtained by applying a partial differentiation operator to said input image along said second direction, and wherein IPx(x,y) is a second intermediate picture obtained by applying a partial differentiation operator to said input image along said first direction.

11. The method of claim 10, wherein receiving said image comprises receiving an astigmatic image.

12. The method of claim 10, wherein calculating a first intermediate image from said input image comprises applying a first differentiation operator to said input image, and wherein calculating a second intermediate image from said input image comprises applying a second differentiation operator to said input image.

13. The method of claim 10, wherein calculating a first intermediate image from said input image comprises single-coordinate differentiation of said input image in the spatial domain, and wherein calculating a second intermediate image from said input image comprises single-coordinate differentiation of said input image in the spatial domain.

14. The method of claim 10, wherein calculating a first intermediate image from said input image comprises anisotropic filtering in the frequency domain, and wherein calculating a second intermediate image from said input image comprises anisotropic filtering of said input image in the frequency domain.

15. The method of claim 10, wherein creating said merit function map comprises blurring said intermediate images.

16. The method of claim 10, wherein creating said merit function map comprises evaluating a function of said intermediate images on a pixel-by-pixel basis.

17. The method of claim 10, further comprising selecting said first and second axes to be horizontal and vertical axes.

18. The method of claim 10, further comprising selecting said first and second axes to be orthogonal axes.

* * * * *